(12) United States Patent
Devenyi

(10) Patent No.: US 8,707,810 B2
(45) Date of Patent: Apr. 29, 2014

(54) LEADSCREW DRIVE WITH ANNULAR-SHELL LEADSCREW

(75) Inventor: Gabor Devenyi, Penetang (CA)

(73) Assignee: Raytheon Canada Limited, Ottawa, Ontario (CA)

( * ) Notice: Subject to any disclaimer, the term of this patent is extended or adjusted under 35 U.S.C. 154(b) by 372 days.

(21) Appl. No.: 12/459,380

(22) Filed: Jun. 30, 2009

(65) Prior Publication Data

US 2009/0288508 A1 Nov. 26, 2009

Related U.S. Application Data

(62) Division of application No. 10/811,561, filed on Mar. 29, 2004, now Pat. No. 7,578,211.

(51) Int. Cl.
*F16H 25/20* (2006.01)

(52) U.S. Cl.
USPC ............... 74/89.23; 74/424.71; 74/424.77

(58) Field of Classification Search
USPC .................. 74/89.23, 424.71, 424.77
See application file for complete search history.

(56) References Cited

U.S. PATENT DOCUMENTS

| | | | | |
|---|---|---|---|---|
| 2,724,979 A | * | 11/1955 | Cross | 74/458 |
| 3,163,054 A | * | 12/1964 | Werner | 74/422 |
| 3,774,295 A | * | 11/1973 | Conlee | 29/456 |
| 4,077,268 A | * | 3/1978 | Hill | 74/424.71 |
| 4,909,009 A | * | 3/1990 | Ogawa et al. | 52/475.1 |
| 5,186,067 A | * | 2/1993 | Demissy | 74/424.6 |
| 5,533,417 A | | 7/1996 | Devenyi | |
| 5,636,549 A | | 6/1997 | Devenyi | |
| 6,768,885 B2 | * | 7/2004 | Shimizu | 399/100 |
| 2003/0095850 A1 | * | 5/2003 | Nishimura et al. | 411/411 |

FOREIGN PATENT DOCUMENTS

| | | | |
|---|---|---|---|
| DE | 198 31 940 | * | 1/2000 |
| JP | 3-134355 | * | 6/1991 |
| JP | 6-264985 | * | 9/1994 |
| JP | 8-108484 | * | 4/1996 |
| JP | 8-129938 | * | 5/1996 |
| JP | 2001-32901 | * | 2/2001 |

* cited by examiner

*Primary Examiner* — William C Joyce
(74) *Attorney, Agent, or Firm* — Christie, Parker & Hale, LLP

(57) ABSTRACT

A leadscrew drive has a leadscrew follower, and a leadscrew. The leadscrew is formed as an elongated annular leadscrew shell having a thread-form outer surface. The leadscrew may be fabricated by depositing a leadscrew-shell material, such as nickel, onto a mandrel having a thread-form outer surface, so that the thread-form outer surface of the mandrel is replicated in an outer surface of the leadscrew-shell material. The mandrel may be removed, to leave a hollow leadscrew shell, or left in place.

13 Claims, 3 Drawing Sheets

LEADSCREW DRIVE WITH ANNULAR-SHELL LEADSCREW

REFERENCE TO RELATED APPLICATION

This Application is a Divisional of U.S. patent application Ser. No. 10/811,561, entitled LEADSCREW DRIVE WITH ANNULAR-SHELL LEADSCREW, filed Mar. 29, 2004 now U.S. Pat. No. 7,578,211, by Gabor Devenyi, the teachings of which are incorporated herein by reference.

This invention relates to a mechanical movement to translate rotational to linear motion and, more particularly, to a leadscrew drive having an annular leadscrew that is particularly suitable for low-to-medium duty applications.

BACKGROUND OF THE INVENTION

Electric motors commonly produce a rotational output, but many mechanisms require that a linear movement be driven by the motor. A leadscrew drive is one approach for translating the rotational movement of the motor to the required linear movement. In the conventional leadscrew drive, the thread of an externally threaded leadscrew engages a recirculating ball nut structure, which in turn is connected to the structure to be driven linearly. As the leadscrew turns, the ball nut structure and the driven structure move linearly.

This conventional leadscrew drive is relatively expensive to produce due to the precision machining required. It is also limited to relatively large-size devices and coarse thread pitches because of the size of the balls used in the recirculating ball nut structure. The conventional leadscrew drive may be subject to excessive wear of the threads, particularly if there is any misalignment. The conventional leadscrew drive also requires careful alignment between the motor, the leadscrew, and the driven structure because of the mechanical engagements at each end of the leadscrew. Another major disadvantage of the conventional leadscrew in light-duty and medium-duty applications is that it has far more strength than is needed, and is quite heavy. The resulting high rotational mass gives the leadscrew a high inertia, adversely affecting its ability to accelerate and decelerate rapidly.

An advance in overcoming some of these disadvantages is described in U.S. Pat. No. 5,636,549, whose disclosure is incorporated by reference. The '549 patent discloses a leadscrew in which the thread structure is defined by a wire wound helically around a cylindrical shaft. A leadscrew-nut assembly is also disclosed for engaging the leadscrew to the linear slide assembly.

The approach of the '549 patent is useful for many applications, but it still has a greater mass and rotational inertia than desired for some applications. There is always a need for a leadscrew drive that has reduced mass, while retaining sufficient strength. The present invention fulfills this need, and further provides related advantages.

SUMMARY OF THE INVENTION

The present approach provides a leadscrew drive and a method for its fabrication. The leadscrew has an extremely low mass while achieving high torsional and axial strengths. The leadscrew is flexible in bending but stiff in axial loading, as required for optimal leadscrew mechanical performance in light-duty and medium-duty applications. The bending flexibility reduces the sensitivity of the leadscrew drive to misalignments. The structure of the leadscrew also aids in isolating the driven component from vibrations in the motor. The leadscrew drive may be readily miniaturized, and retains its advantages in the miniature form.

In accordance with the invention, a leadscrew drive comprises a leadscrew follower and a leadscrew. The leadscrew comprises an elongated annular leadscrew shell having a thread-form outer surface. The elongated annular leadscrew shell may be provided with or without a core support. The absence of a core support increases lateral flexibility. The elongated annular leadscrew shell may be made of any operable material, but is preferably made of a nickel-base metal.

A method for making a leadscrew drive comprises the steps of fabricating a leadscrew by providing a mandrel having a thread-form outer surface, and depositing a leadscrew-shell material onto the mandrel to form an elongated annular leadscrew shell. The thread-form outer surface of the mandrel is replicated in an outer surface of the leadscrew-shell material, so that the leadscrew has the same external thread pattern as the mandrel. This manufacturing approach allows the annular leadscrew shell to be very thin relative to its diameter, in some cases with a ratio of an annular thickness to a cylindrical outer diameter of not more than 0.01, and in some cases not more than 0.001. Thicker leadscrew shells are operable, but the greatest advantages of this approach are realized when the leadscrew shell is very thin compared to its annular diameter.

The mandrel is preferably a wire-wound mandrel, made in the manner described in the '549 patent, but other types of mandrels are operable as well. The leadscrew shell is formed by depositing the leadscrew-shell material by any operable approach. The deposition may be by electrodeposition on an electrically conductive mandrel, or by electroless deposition of a metal such as a nickel-base material on either an electrically conductive mandrel or an electrically nonconductive mandrel.

If the leadscrew is to have a core, the mandrel may remain in place. If the leadscrew is not to have a core, the mandrel may be removed by any operable approach. In one operable approach, at least a portion of the mandrel is dissolved away, leaving only the leadscrew shell.

When the leadscrew has no core and is hollow, non-revolving elements may be passed up the interior of the leadscrew between the motor end and the driven-structure end. For example, an optical fiber or an electrical wire may be passed through the interior of the leadscrew. Liquid or gas may also be flowed through the interior of the hollow-leadscrew embodiment. Some drive motors are available with a hollow shaft, so that a pass-through volume in the center of the motor shaft and the center of the hollow leadscrew may be used to lead non-rotating optical fibers, electrical wire, or the like between the motor and the distal end of the leadscrew, or pass a liquid or gas through the entire length of the system.

Once fabricated, the leadscrew shell is engaged to an appropriate leadscrew follower.

The leadscrew in the form of the leadscrew shell is laterally flexible because of its annular thinness. It has good axial resistance to stretching and compression due to the web that extends between the thread-form surfaces that provide the drive force. The leadscrew shell is made only as thick as is necessary for the required strength. There is a relatively high torque-carrying capability because the mass of the leadscrew shell is disposed far from the cylindrical axis.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
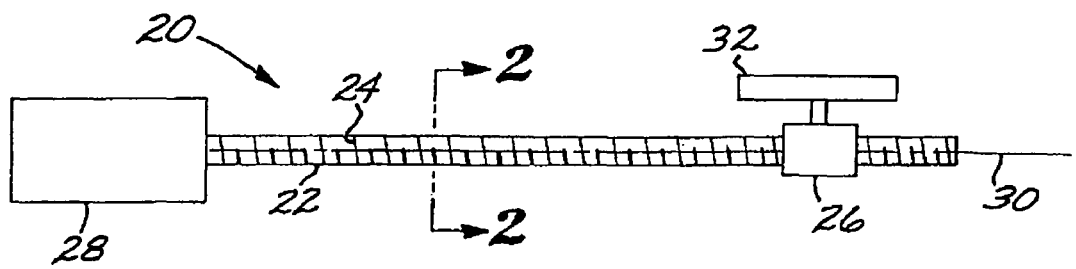
FIG. 1 is a schematic view of a preferred embodiment of a leadscrew drive according to the present approach.

FIG. 1 depicts a leadscrew drive 20. The leadscrew drive includes an elongated leadscrew 22 having a helical external thread-form 24 that is engaged to a conforming internal thread (not visible) of a leadscrew follower 26. The leadscrew 22 is rotationally driven by a motor 28. As the leadscrew 22 rotates, the engagement of its external thread-form 24 to the conforming internal thread of the leadscrew follower 26 causes the leadscrew follower 26 to move linearly parallel to a longitudinal axis 30 of the elongated leadscrew 22. A driven component 32 is affixed to the leadscrew follower 26, and moves with the leadscrew follower. (Equivalently, the leadscrew follower 26 may be fixed in position, so that the leadscrew 22 and the motor 28 move parallel to the longitudinal axis 30 as the leadscrew 22 turns.)

Figure 2:
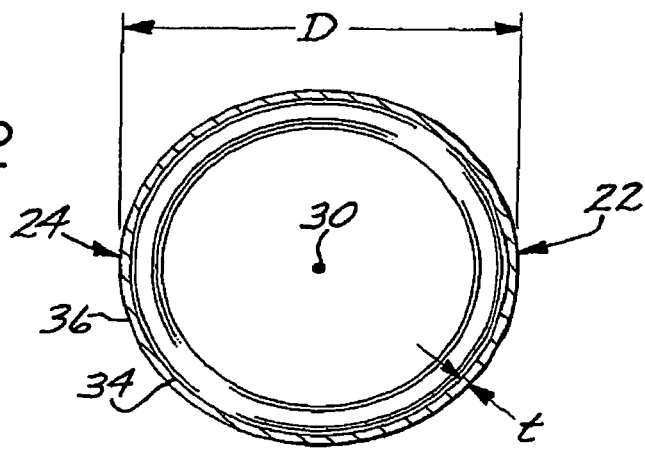
FIG. 2 is an enlarged schematic sectional view through a first embodiment of the leadscrew of FIG. 1, taken on line 2-2.
Figure 3:
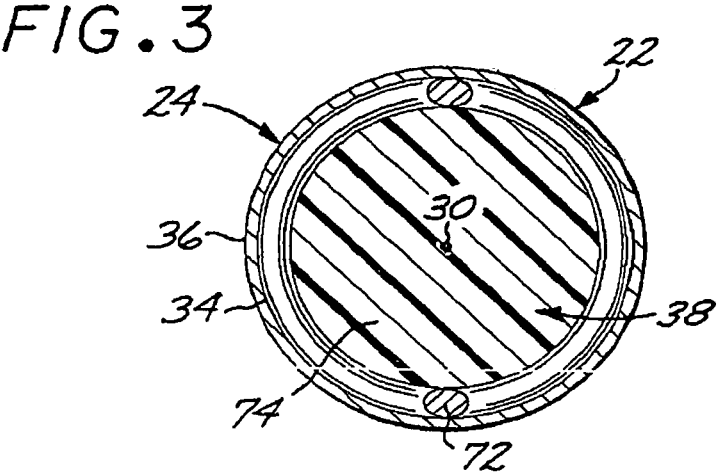
FIG. 3 is an enlarged schematic sectional view through a second embodiment of the leadscrew of FIG. 1, taken on line 2-2.
Figure 6:
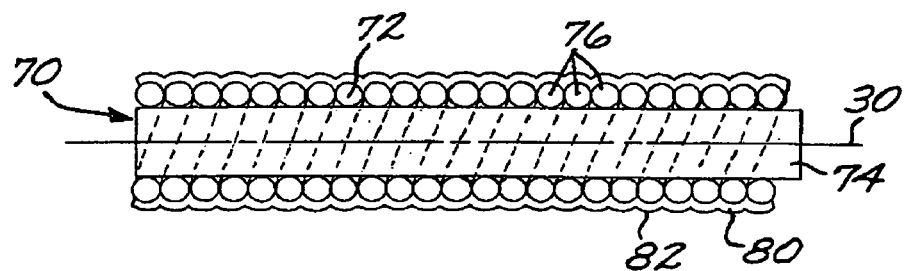
FIG. 6 is a side elevational view of the mandrel of FIG. 5, with an annular leadscrew shell deposited thereon and with the interior structure shown in phantom lines.
Figure 7:
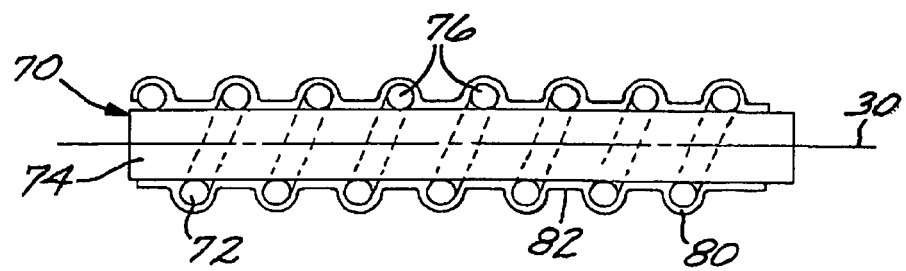
FIG. 7 is a side elevational view of another embodiment of the mandrel, with the annular leadscrew shell deposited thereon and with the interior structure shown in phantom lines.

In the present approach and as shown in FIGS. 2-3, the leadscrew 22 comprises an elongated annular leadscrew shell 34 whose outer surface 36 has the helical thread-form 24 (although that thread-form 24 is not readily discernible in FIGS. 2-3 and is more clearly seen in FIGS. 6-7). The annular leadscrew shell 34 is preferably fabricated by a deposition process discussed subsequently. The annular leadscrew shell 34 may have any operable annular thickness. When the preferred deposition process is used, the annular thickness of the annular leadscrew shell 34 may be quite small. A ratio t/D of an annular thickness t of the annular leadscrew shell 34 to a cylindrical outer diameter D of the annular leadscrew shell may be not more than 0.01, and in some cases not more than 0.001. This construction places the leadscrew-shell material that comprises the leadscrew shell 34 at a maximum distance from the longitudinal axis 30, for maximum strength in the torque loading required of the leadscrew 22 while achieving minimal mass and inertia of the leadscrew shell 34.

The elongated annular leadscrew shell 34 may be completely hollow in its interior, and therefore has no core support, as shown in FIG. 2. The elongated annular leadscrew shell 34 may instead have a core support 38, as shown in FIG. 3. The nature of the specific type of core support 38 illustrated in FIG. 3 will be discussed subsequently in relation to the fabrication method.

The elongated annular leadscrew shell 34 may be made of any operable material. Preferably, the elongated annular leadscrew shell 34 is made of a metal, and specifically a nickel-base metal. The "nickel-base metal" contains more nickel than any other metallic element, and may be substantially pure nickel, a nickel-alloy (e.g., nickel-copper, nickel-phosphorus with phosphorus at various concentrations according to the desired properties, or nickel-aluminum), or a composite material having a non-metal (e.g., polytetrafluoroethylene particles) embedded in a metallic matrix (e.g., pure nickel or a nickel alloy).

Figure 4:
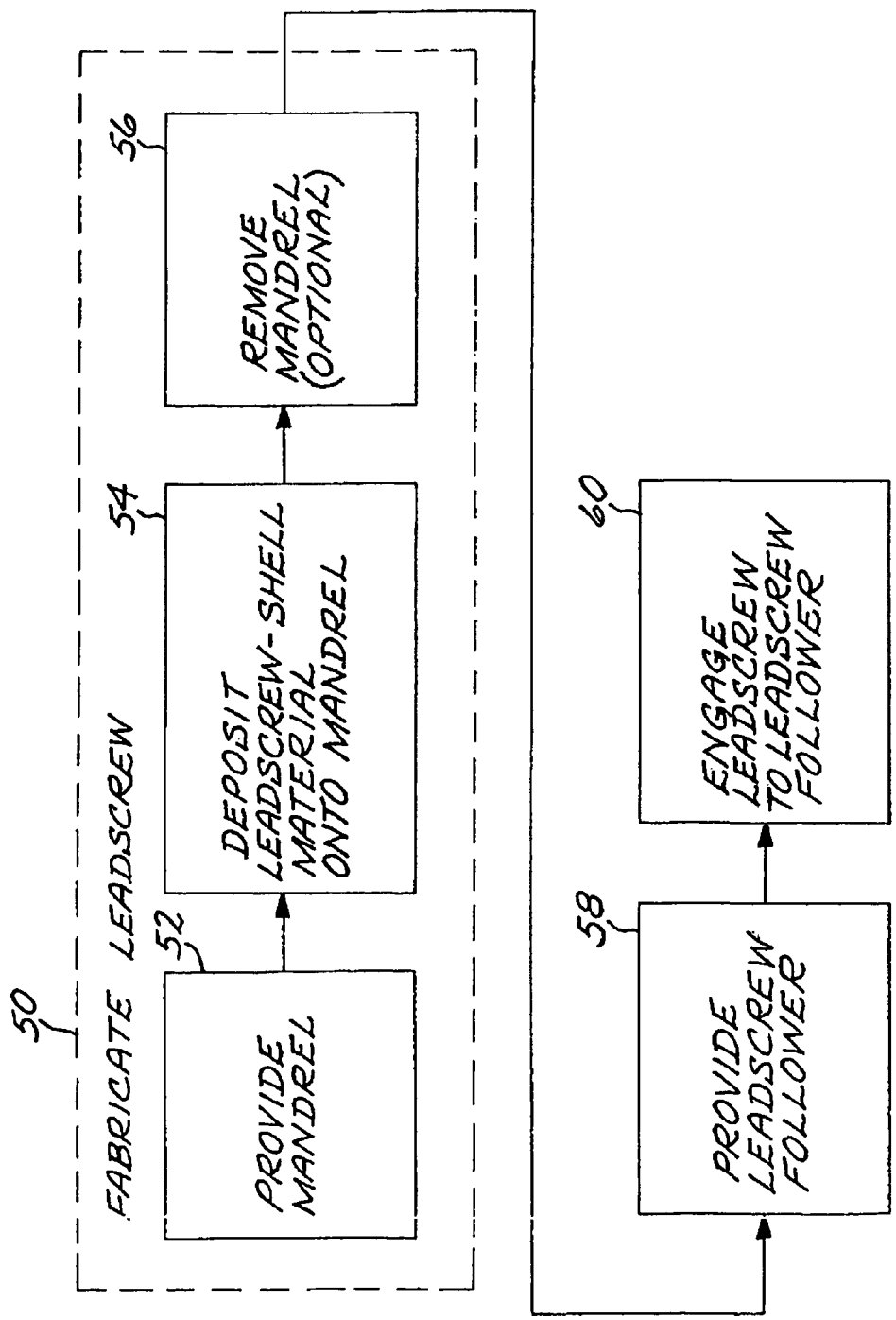
FIG. 4 is a block diagram of a preferred method for fabricating a leadscrew drive by the present approach.
Figure 5:
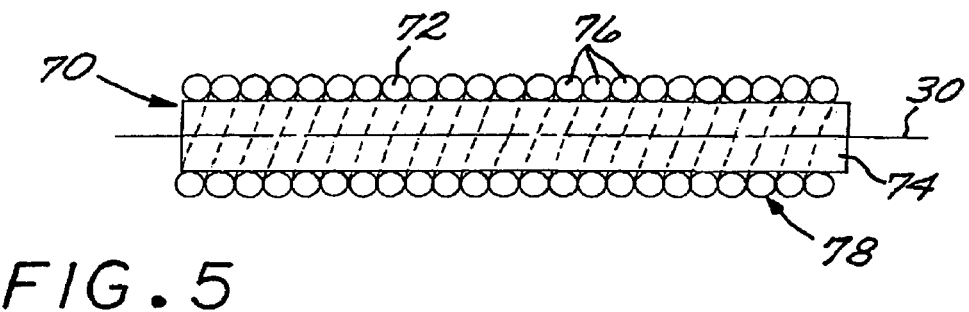
FIG. 5 is a side elevational view of a preferred embodiment of a mandrel.

FIG. 4 depicts in block diagram form a preferred method for making the leadscrew drive 20. The leadscrew 22 is fabricated, step 50. The fabrication 50 includes first providing a mandrel having a thread-form outer surface, step 52. FIG. 5 illustrates a preferred form of the mandrel 70. This mandrel 70 is preferably prepared as a wire-wound mandrel by helically winding a round wire 72 of a material such as aluminum onto a cylindrical rod 74, and affixing the wire 72 in place to the rod 74, as with a spot weld or an adhesive. In this preferred embodiment, the turns 76 of the wire 72 are closely adjacent to each other in the axial direction 30 of the leadscrew 22, and preferably are touching. The turns 76 of the helically wound wire 72 may instead be well spaced apart from each other, as shown in the embodiment of FIG. 7. These turns 76 of the helically wound wire 72 define the thread-form outer surface 78 of the mandrel 70. The mandrel 70 may instead be prepared by a conventional machining or rolling of the thread-form outer surface on a solid rod or a hollow tube. This alternative approach is not preferred for the fabrication of small-diameter leadscrews, the preferred application of the present approach, because it is difficult to machine or roll such small diameter rods that have a thin wall.

A relatively thin layer of a leadscrew-shell material 80 is deposited, step 54, onto the mandrel 70 to form the elongated annular leadscrew shell 34, as shown in FIG. 6. The thread-form outer surface 78 of the mandrel 70 is replicated in an outer surface 82 of the leadscrew-shell material 80. The result is that the outer surface 82 of the annular leadscrew shell 34 has substantially the same thread-form as the thread-form outer surface 78 of the mandrel 70, except for the thickness of the leadscrew-shell material 80 (which is taken into account by initially making the mandrel 70 slightly undersize).

The deposition process used in the deposition step 54 is selected according to the nature of the leadscrew-shell material 80. It is preferred that the deposition process not be a line-of-sight deposition process, as the deposition of an even layer of the leadscrew-shell material 80 would be difficult. Instead, it is preferred that a non-line-of-sight process be used. The preferred leadscrew-shell material 80 is a metal, and most preferably a nickel-base metal as described earlier. The nickel-base metal may be deposited from solution by an electrolytic or an electroless deposition process. The use of an electroless deposition process is preferred, as there is no requirement that the mandrel 70 be electrically conducting.

Electroless plating is an immersion plating wherein a chemical reducing agent changes metal ions to metal. The electroless plating of a stand-alone article may also be termed electroless forming, by analogy with electroforming. A number of different metals, in pure, alloy, or composite form, may be deposited by electroless deposition. Such deposition processes are known in the art for other applications. In a typical case, nickel-base metal may be deposited from a nickel-sulfate solution by reduction with sodium hypophosphite, by the chemical reaction

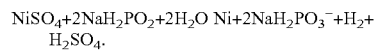

$$NiSO_4 + 2NaH_2PO_2 + 2H_2O \rightarrow Ni + 2NaH_2PO_3^- + H_2 + H_2SO_4.$$

Nickel-base alloys are deposited by including a co-reducible species in the solution that contains the alloying elements. Composites such as polytetrafluoroethylene particles in a nickel-base matrix may be deposited by introducing the particles into the solution so that they are captured in the nickel-base metal matrix as it deposits.

The result of the deposition step 54 is the continuous leadscrew shell 34, as seen in FIGS. 6 and 7. The raised areas that define the thread-form are effectively "fused" together in the direction parallel to the longitudinal axis 30, giving the leadscrew shell 34 good axial strength and stiffness parallel to the longitudinal axis 30, and also good stability in bending perpendicular to the longitudinal axis 30.

The use of an electroless nickel-base metal as the leadscrew-shell material has particular advantages. The mandrel 70 need not be electrically conducting, and can therefore be a plastic or other nonmetal. The electroless deposition produces deposits that are of even thickness and of a high relative density with little porosity. The electroless nickel is strong and hard, which is desirable to avoid deformation during service of the thread-form outer surface 82 of the leadscrew shell 34 as it slides over the internal threads of the leadscrew follower 26. The introduction of small amounts of alloying elements increases the strength and hardness even further. The absorption of hydrogen into the electroless nickel deposit is low. There is little residual stress in the deposit, an important consideration for a thin shell that might otherwise deform if residual stresses are present.

Additionally, the electroless nickel deposit is smooth, has a low coefficient of sliding friction and is non-galling, unlike many electrodeposited metals such as electrodeposited nickel. The coefficient of friction and galling tendency are reduced even further by incorporating up to 20 percent by volume of polytetrafluoroethylene particles (available commercially as Teflon® particles) into the electroless nickel deposit.

The deposition step 54 is continued for as long as necessary to build up the desired thickness of the annular leadscrew shell 34. The deposition rate of electroless nickel in typical commercial deposition processes is relatively slow and on the order of 0.0005-0.001 inches per hour, so that the thickness of the deposited leadscrew-shell material 80 may be precisely controlled by the length of the deposition step 54. In a typical case of the deposition of the annular leadscrew shell 34, the ratio t/D of the annular thickness t of the annular leadscrew shell 34 to the cylindrical outer diameter D of the annular leadscrew shell 34 (see FIG. 2) may be not more than 0.01, and in some cases not more than 0.001. The value of t/D is 0.0004-0.001 in cases of particular interest.

Optionally, after the deposition step 54, the mandrel 70 may be removed in whole or in part, step 56. Because the electroless deposition may be performed on a nonmetallic mandrel 70, the mandrel may be made of plastic, foam, and other similar materials that are readily removed by heating to vaporize the mandrel materials and/or dissolution to dissolve the mandrel materials. If the removal step 56 is not performed and none of the mandrel 70 is removed, the leadscrew 22 may have the cross-sectional construction shown in FIG. 3, with both the annular leadscrew shell 34 and the core support 38 present. If the removal step 56 is performed to remove all of the mandrel 70 and thence all of the core support 38, the leadscrew 22 has the hollow cross-sectional construction shown in FIG. 2. An intermediate approach may be followed, where only a part of the mandrel 70 is removed, for example removing the rod 74 and leaving the wire 72 in place. The mandrel rod 74 may instead be initially supplied as a hollow tube, so that the leadscrew 22 is hollow after the deposition 54. Removing all or part of the mandrel 70, or otherwise using a hollow mandrel, reduces the strength and stiffness of the annular leadscrew shell 34 parallel to the longitudinal axis 30, but also reduces the bending stiffness perpendicular to the longitudinal axis 30. The selection of the cross-sectional construction of the leadscrew 22 is made responsive to the mechanical requirements of the particular application of the leadscrew drive 20.

Following fabrication of the leadscrew, step 50, the leadscrew follower 26 is provided, step 58. The leadscrew follower 26 may be of any operable type including, for example, a conventional machined leadscrew follower, a wire-wound nut leadscrew follower, a tilted ball bearing leadscrew follower, or a spring pin nut leadscrew follower. The leadscrew 22 is thereafter engaged to the leadscrew follower 26, step 60. The motor 28 is affixed to the driven end of the leadscrew 22.

Although a particular embodiment of the invention has been described in detail for purposes of illustration, various modifications and enhancements may be made without departing from the spirit and scope of the invention. Accordingly, the invention is not to be limited except as by the appended claims.

The invention claimed is:

1. A leadscrew drive comprising:
   a leadscrew follower; and
   an elongated flexible tubular leadscrew shaft comprising:
   an internal core support comprising a helical wire; and
   a leadscrew shell supported on the internal core support and including an outer surface having a helical thread-form,
   wherein the leadscrew shaft engages the leadscrew follower and extends through the leadscrew follower to an end of the leadscrew shaft that is rotationally driveable by a motor and spaced apart from the leadscrew follower along a longitudinal axis of the leadscrew shaft, and
   wherein a thickness of the leadscrew shell including the helical thread-form is substantially constant along a length of the leadscrew shell having the helical thread-form.

2. The leadscrew drive of claim 1, wherein:
   the leadscrew shell is formed to have a ratio of annular thickness to an outer diameter of the leadscrew of not more than 0.01.

3. The leadscrew drive of claim 1, wherein:
   the leadscrew shell is formed to have a ratio of annular thickness to an outer diameter of the leadscrew within the range of 0.0004 to 0.01.

4. The leadscrew drive of claim 3, wherein:
   the leadscrew shell is of a nickel-alloy metal formed of an electroless deposited nickel-based matrix, the electroless deposited nickel-based matrix having polytetrafluoroethylene particles.

5. The leadscrew drive of claim 4, wherein:
   the amount of polytetrafluoroethylene particles is about 20% by volume.

6. The leadscrew drive of claim 3, wherein:
   the leadscrew shell is formed of a high density, low porosity, smooth material with an even thickness.

7. The leadscrew drive of claim 1, wherein:
   the leadscrew shell is formed of a nickel-based metal.

8. The leadscrew drive of claim 7, wherein:
   the leadscrew shell is formed of a nickel-alloy metal.

9. The leadscrew drive of claim 1, wherein:
   the leadscrew shell is formed of an electroless deposited nickel-based matrix.

10. The leadscrew drive of claim 9, wherein:
    the leadscrew shell is formed of an electroless deposited nickel-based matrix with polytetrafluoroethylene particles.

11. The leadscrew drive of claim 10, wherein:
the amount of polytetrafluoroethylene particles is about 20% by volume.

12. The leadscrew drive of claim 1, wherein:
the leadscrew shell is formed of a high density, low porosity material.

13. The leadscrew drive of claim 12, wherein:
the leadscrew shell is of even thickness and formed of a smooth material.

* * * * *